(12) United States Patent
Wiener et al.

(10) Patent No.: US 9,176,860 B2
(45) Date of Patent: Nov. 3, 2015

(54) DATABASE JOIN OPTIMIZED FOR FLASH STORAGE

(75) Inventors: Janet L. Wiener, Palo Alto, CA (US); Stavros Harizopoulos, San Francisco, CA (US); Mehul A. Shah, Saratoga, CA (US); Goetz Graefe, Madison, WI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1734 days.

(21) Appl. No.: 12/370,551

(22) Filed: Feb. 12, 2009

(65) Prior Publication Data

US 2010/0205351 A1    Aug. 12, 2010

(51) Int. Cl.
*G06F 12/00* (2006.01)
*G06F 12/02* (2006.01)
*G06F 17/30* (2006.01)

(52) U.S. Cl.
CPC ...... *G06F 12/0246* (2013.01); *G06F 17/30498* (2013.01); *G06F 2212/7202* (2013.01)

(58) Field of Classification Search
USPC .................................. 707/112; 711/103
See application file for complete search history.

(56) References Cited

U.S. PATENT DOCUMENTS

| | | | |
|---|---|---|---|
| 6,374,235 B1 * | 4/2002 | Chen et al. ............................ | 1/1 |
| 7,420,841 B2 * | 9/2008 | Ruf et al. ................. | 365/185.09 |
| 2006/0080324 A1 * | 4/2006 | Bower et al. ................. | 707/100 |
| 2006/0277157 A1 | 12/2006 | Seidl et al. | |
| 2008/0183663 A1 | 7/2008 | Day et al. | |
| 2009/0012980 A1 | 1/2009 | Stefani et al. | |

\* cited by examiner

*Primary Examiner* — Jared Rutz
*Assistant Examiner* — Hamdy S Ahmed
(74) *Attorney, Agent, or Firm* — Mannava & Kang, P.C.

(57) ABSTRACT

Computer-implemented systems and associated operating methods implement a fast join for databases which is adapted for usage with flash storage. A system comprises a processor that performs a join of two tables stored in a storage in pages processed in a column orientation wherein column values for all rows on a page are co-located in mini-pages within the page. The processor reduces input/output operations of the join by accessing only join columns and mini-pages containing join results.

14 Claims, 11 Drawing Sheets

```
1. Read J₂ and partition it (hash on join value)
2. Read J₁ and partition it (same hash function)
3. Compute JI
foreach partition of J₂ do
        Read J₂ and build hash table
        Read partition of J₁ and probe hash table
        foreach row in join result do
                Write id₁, id₂ in JI partition
4. Merge partitions of JI on id₁
foreach join result <id₁, id₂> do
        Read projected values of row id₁ from V₁
        /* R and I₂ are partitioned by id₂ */
        Write projected values into partition of R
        Write id₂ into partition of I₂
5. Read I₂ and process it.
foreach partition of I₂ do
        foreach id₂ in partition do
                Read projected values of row id₂ from V₂
                Write values into partition of R Two-pass RARE join. Two passes are needed when J₂
plus the outgoing buffers for the partitions of R do not fit
in memory.
```

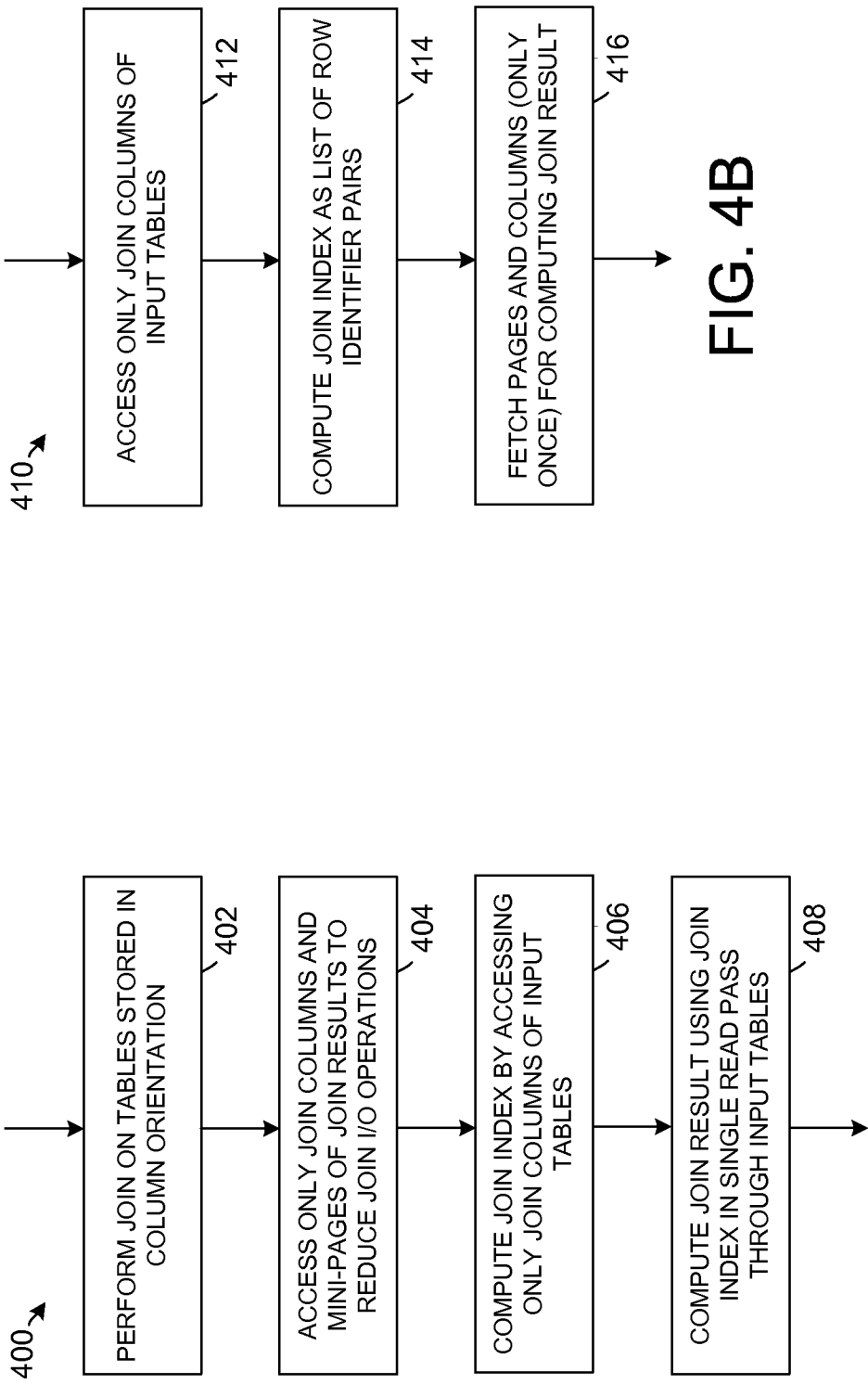

TABLE I

|  | SATA Disk | USB Flash | Zeus Flash |
|---|---|---|---|
| GB | 250 | 16 | 146 |
| s/GB | $0.40 | $8.10 | $102 |
| Watts(W) | 12 | 0.5 | 8.4 |
| seq. read (MB/s) | 60 | 26 | 92 |
| seq. write (MB/s) | 55 | 20 | 108 |
| ran. read (MB/s) | 120 | 1500 | 54000 |
| ran. write (MB/s) | 120 | 40 | 15000 |
| IO/s/S | 1.2 | 11 | 3.6 |
| IO/s/W | 10 | 3000 | 6430 |

FIG. 5

PLAYER TABLE

| NAME | ADDRESS | AGE | TEAM |
|---|---|---|---|
| Ben | 18 Main Street | 7 | Orange |
| Julie | 21 Iris Lane | 8 | Red |
| Sam | 110 Hays Drive | 7 | Green |
| Sarah | 2 Main Street | 7 | Blue |
| Alex | 90 Primrose | 8 | Red |
| Lena | 44 Madison | 7 | Orange |

FIG. 7A

GAME TABLE

| TEAM | FIELD | TIME |
|---|---|---|
| Red | Terman | 1 |
| Orange | Ohlone | 9 |
| *Orange* | *Carmelo* | 3 |
| Blue | Briones | 2 |

FIG. 7B

1. Read $J_2$ and build hash table
2. Read $J_1$ and probe hash table
foreach join result <$id_1$, $id_2$> do
    Read projected values of row $id_1$ from $V_1$
    /* R and $I_2$ are both partitioned by $id_2$ */
    Write projected values into partition of R
    Write $id_2$ into partition of $I_2$
3. Read $I_2$ and process it.
foreach partition of $I_2$ do
    foreach $id_2$ in partition do
        Read projected values of row $id_2$ from $V_2$
        Write values into partition of R One pass RARE join. Only one pass is needed when $J_2 + 2(V_2/M) < M$. That is, the join column of $T_2$ and output buffers for partitions of R fit in memory (but all of $T_2$ might not)

FIG. 8

HASH TABLE ON GAME.TEAM

| Blue, $id_d$ |
|---|
| Red, $id_a$ |
| Orange.$id_c$ → Orange.$id_b$ |

FIG. 9A

INDEX PARTITIONS AFTER
STEP 2 OF RARE-JOIN

| | |
|---|---|
| Red | Orange |
| Blue | Orange |
| Red | *Orange* |
| | Orange |

FIG. 9B

PARTITIONED RESULT
AFTER STEP 2 OF RARE-JOIN

| Julie | Red |
|---|---|
| Sarah | Blue |
| Alex | Red |

| Ben | Orange |
|---|---|
| Ben | Orange |
| *Lena* | *Orange* |
| Lena | Orange |

FIG. 9C

RESULT TABLE AT END
OF RARE-JOIN

| Julie | Red | 1 |
|---|---|---|
| Sarah | Blue | 2 |
| Alex | Red | 1 |
| Ben | Orange | 9 |
| Ben | Orange | 3 |
| *Lena* | *Orange* | *9* |
| Lena | Orange | 3 |

FIG. 9D

1. Read $J_2$ and partition it (hash on join value)
2. Read $J_1$ and partition it (same hash function)
3. Compute JI
foreach partition of $J_2$ do
    Read $J_2$ and build hash table
    Read partition of $J_1$ and probe hash table
    foreach row in join result do
        Write $id_1$, $id_2$ in JI partition
4. Merge partitions of JI on $id_1$
foreach join result <$id_1$, $id_2$> do
    Read projected values of row $id_1$ from $V_1$
    /* R and $I_2$ are partitioned by $id_2$ */
    Write projected values into partition of R
    Write $id_2$ into partition of $I_2$
5. Read $I_2$ and process it.
foreach partition of $I_2$ do
    foreach $id_2$ in partition do
        Read projected values of row $id_2$ from $V_2$
        Write values into partition of R Two-pass RARE join. Two passes are needed when $J_2$ plus the outgoing buffers for the partitions of R do not fit in memory.

FIG. 10

DATABASE JOIN OPTIMIZED FOR FLASH STORAGE

BACKGROUND

A join is a fundamental operation in relational algebra used to combine records from two tables in a relational database, resulting in a new and temporary table, sometimes called a joined table. The join can also be considered an operation that relates tables by values common to the tables.

Several general types of join algorithms are known. A first group of join methods is optimized for tables and indexes stored on disk, and include, for example, sort-merge join, Grace-hash join, hybrid-hash join, and sorted-outer-index-nested-loops join. The first group join methods are optimized for the I/O characteristics of disk, so that reads and writes to sequential pages are much faster than reads and writes to random pages. Therefore, the algorithms attempt to always read and write pages in sequential order. A problem with join methods in the first group is that the algorithms avoid random read page accesses and thus cannot exploit the fast random read access times on flash storage.

A second group of join methods, such as index-nested-loops join; work well when very few rows in one table or index are needed—so few that waiting for random reads of only the pages containing those rows is worthwhile. A problem with the second group of join methods is inefficiency unless extremely few accesses are made, since only one row is accessed at a time per page. The same page may therefore be needed (and read) multiple times. Even with flash storage, reading each page only once is still worthwhile.

A third group of join methods, such as nested-loops join, only work well when one table fits in memory. The third group methods are not used much, since the other algorithms also work well when one table fits in memory and are sufficient when the table is larger than memory capacity.

SUMMARY

Embodiments of computer-implemented systems and associated operating methods implement a fast join for databases which is adapted for usage with flash storage. A system comprises a processor that performs a join of two tables stored in storage in pages processed in a column orientation wherein column values for all rows on a page are co-located in mini-pages within the page. The processor reduces input/output operations of the join by accessing only join columns and mini-pages containing join results.

BRIEF DESCRIPTION OF THE DRAWINGS

Embodiments of the invention relating to both structure and method of operation may best be understood by referring to the following description and accompanying drawings:

FIGS. 4A through 4C are flow charts illustrating one or more embodiments or aspects of a computer-executed method for performing a fast join for databases which is adapted for usage with flash storage;

FIG. 5 is a table showing disk and flash characteristics from manufacturer specifications;

FIGS. 7A and 7B are data diagrams illustrating Player and Game tables for an example of RARE-join operation;

FIG. 8 depicts pseudocode for an embodiment of a one-pass RARE-join algorithm;

FIGS. 9A, 9B, 9C, and FIG. 9D are data diagrams showing a hash table, partition contents, and a final result table in an example RARE-join operation; and FIG. 10 depicts pseudocode for an embodiment of a two-pass RARE-join algorithm.

DETAILED DESCRIPTION

Figure 1:
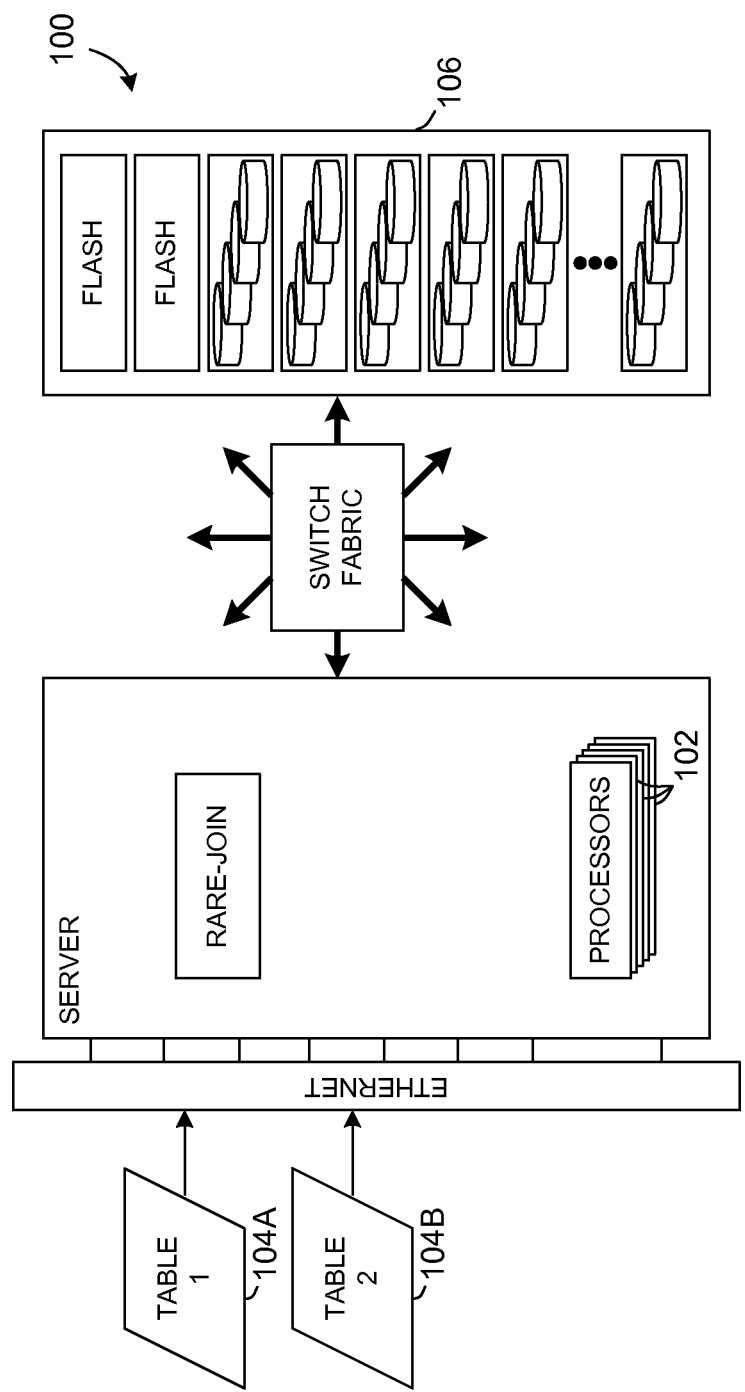
FIG. 1 is a schematic block diagram showing an embodiment of a computer-implemented system that implements a fast join for databases which is adapted for usage with flash storage.

Embodiments of systems and associated operating methods perform a fast join for databases over flash storage.

A new join algorithm is optimized for non-volatile, fast random access, storage. With fast random access, a column-oriented page layout is practical and allows the join method to access only one table column at a time, for example only the join column. The illustrative join method accesses only the join columns first to compute a join index over the two tables, then accesses only needed pages in the base tables, only once each, to compute the join result.

The join method disclosed herein enables faster processing of joins. Database joins are a common and useful component of queries, updates, and materialized view maintenance. For example, most data warehouse queries contain multiple joins, often ten or more joins. Neoview is a data warehouse project that is produced by Hewlett-Packard Company of Palo Alto, Calif. The faster Neoview can process queries, the more work a given Neoview system configuration can handle and the better and more efficiently the Neoview system performs.

The novel join algorithm is optimized for non-volatile, fast random access, storage, thereby enabling joins to run faster. The new join algorithm also can compute joins over larger tables in fewer passes (which is faster) because the algorithm requires less memory than other join methods.

The novel join algorithm can exploit the fast random read access times of flash storage. When the time difference between sequential reads and random reads is low—a property of flash memory, then new algorithms can be faster than the traditional algorithms. Also, unlike an index-nested-loops join, the novel join does not require an index to exist on the appropriate join column(s).

Systems and techniques are disclosed herein for improving performance and efficiency of core query processing, such as scans and joins, when using flash storage. Some of the illustrative techniques can exploit a PAX-based page layout, which enables scans to avoid reading columns not needed for the query. A PAX layout works well for flash drives which offer much shorter seek times than traditional disks. A join algorithm, called a random, read-efficient join (RARE-join), can leverage the PAX structure to read only the columns needed to compute the join result. RARE-join first computes a join-index by retrieving the join-columns and then fetches the remaining columns for the result. RARE-join using a PAX layout outperforms traditional hash-based joins with row layout when few columns are returned and the selectivity is low. Moreover, RARE-join uses less memory than traditional hash-joins.

A novel join algorithm, which may be called a random, read-efficient join (RARE-join), to compute the equi-join of two tables stored on a non-volatile store that offers fast page-based random accesses. A NAND Flash-based solid state drive is a practical example of such a store, but the algorithm may be advantageous in combination with other upcoming nonvolatile technologies such as PCRAM, FeRAM, MRAM, NRAM, and on the like. Traditional out-of-memory join algorithms assume rows in "on-disk" pages are stored contiguously and thus make at least one pass through both tables to compute the join result. RARE-join, on the other hand, processes pages that are column-oriented. Thus, column values for all rows on a page are co-located in mini-pages within the page. RARE-join exploits the layout by skipping over columns and rows not needed to compute the join result. The disclosed approach is worthwhile when the cost of skipping (performing a random access) is less than the cost to read the data being skipped (the size of at least one mini-page), a property that holds for the disclosed non-volatile technologies.

Conceptually, RARE-join has two steps. First, RARE-join accesses only the join columns of the input tables and computes the join index. The join index is a list of pairs of row-ids. Each row in the join result is represented by one pair of row-ids, one row-id from each table, with rows' join columns equal. Second, RARE-join fetches the pages (and columns from those pages) used to compute the join result only once.

In comparison to traditional join algorithms such as Grace-hash join, RARE-join avoids transferring data unneeded to produce the join result (the second step) at the cost of computing (and possibly writing out) the join index (the first step). RARE-join outperforms traditional algorithms (a) when only a subset of the columns is needed and/or (b) when the selectivity of the join is low. In these cases, the savings from avoiding unneeded I/O can outweigh the cost of join index computation.

Moreover, the memory footprint of RARE-join is much smaller than that of traditional joins since RARE-join only keeps the join columns in memory. Thus, RARE-join can compute the result in fewer passes over the input tables for larger table sizes than when using traditional joins. Each pass means writing and then reading all or part of the table data. Fewer passes means faster joins.

Referring to FIG. 1, a schematic block diagram illustrates an embodiment of a computer-implemented system 100 that implements a fast join for databases which may be termed a RARE-join and is adapted for usage with flash storage. The system 100 comprises a processor 102 that performs a join of two tables 104A, 104B stored in a storage 106 in pages processed in a column orientation wherein column values for all rows on a page are co-located in mini-pages within the page. The processor 102 reduces input/output operations of the join by accessing only join columns and mini-pages containing join results.

In an example implementation, the processor 102 computes a join index by accessing only the join columns of input tables and uses the join index to compute a join result in a single read pass through the input tables.

In an illustrative implementation of the fast join, the processor 102 accesses only join columns of input tables and computes a join index as a list of row identifier pairs wherein rows in a join result are represented by one pair of row identifiers. The pair of row identifiers includes one row identifier from each table for which row join columns are equal.

The processor 102 fetches pages and columns from the fetched pages for usage in computing the join result with the fetches being made only once.

The processor 102 optimizes for fast random read page accesses wherein pages are read only once in non-sequential order and pages are written in sequential order.

The processor 102 can perform a one-pass join of a first table and a second table wherein both the first table and the second table fit in memory comprising actions of building a hash table by reading a single join column of the second table, and probing the hash table by reading a single join column of the first table, and probing the hash table for matching join columns from the second table. The processor 102 retrieves projected columns of both the first and second tables for each matching pair of join columns, and writes the retrieved columns of both the first and second tables to a join result.

The processor 102 can also perform a one-pass join over a second table and a separate pass over a first table wherein the first table does not fit in memory in combination with the second table comprising probing the hash table for each join result of a first table row identifier and a second table row identifier. Probing the hash table can comprise actions of reading values of projected columns of the first table indexed by the first table row identifier, writing the projected values into a partition of the join result partitioned by the page identifiers (which can be embedded or obtainable from the row identifiers) of the second table, and writing the second table row identifier into a partition of a temporary file of second table row identifiers.

The processor 102 can write projected columns of the second table to a join result comprising actions of reading values of projected columns of the second table indexed by the second table row identifier, and writing the projected values into the partition of the join result.

The processor 102 can perform a two-pass join of a first table and a second table. One implementation of a two-pass join can comprise the actions of partitioning the first and second tables on join columns wherein the first table and the second table are both read and written, and computing a join result comprising reading each partition, computing, and writing the join result.

The processor 102 can perform another implementation of a two-pass join of a first table and a second table using a hash function. The two-pass join comprises actions of reading and partitioning the join column of the second table using a hash function on join value, reading and partitioning the join column of the first table using the hash function, and computing a join index containing a first table row identifier and a second table row identifier for each partition. The processor 102 further can merge partitions of the join index into first table order, fetch projected columns of the first table, and write projected values into a partition of the join result and second table row identifiers into a partition of a temporary file of second table row identifiers. The probed columns of the second table are written to a join result.

In a further implementation, the processor 102 can perform another implementation of a two-pass join of a first table and a second table that uses a hash function. The two-pass join comprises actions of reading and partitioning the join column of the second table using a hash function on join value, reading and partitioning the join column of the first table using the hash function, and computing a join index containing a first table row identifier and a second table row identifier for each partition. The join index can be computed by reading the column of the second table and building a hash function, reading a partition of the first table and probing the hash table, and for each row in a join result, retrieving the projected columns from the first table and writing the projected values into a partition of the join result. The second table row identifier can then be written into a partition of a temporary file of second table row identifiers. The processor 102 can compute the final result by reading values of projected columns of the second table indexed by the second table row identifier, and writing the projected values into the partition of the join result.

The illustrative join techniques are particularly useful for flash-based storage. For example, the storage 106 can comprise a non-volatile store that supports fast page-based random accesses. Examples of storage 106 can included a flash-based solid state drive, phase-change random access memory (PCRAM), ferro-electric random access memory (FeRAM), magneto-resistive random access memory (MRAM), nano-random access memory (NRAM), and others.

Figure 2:
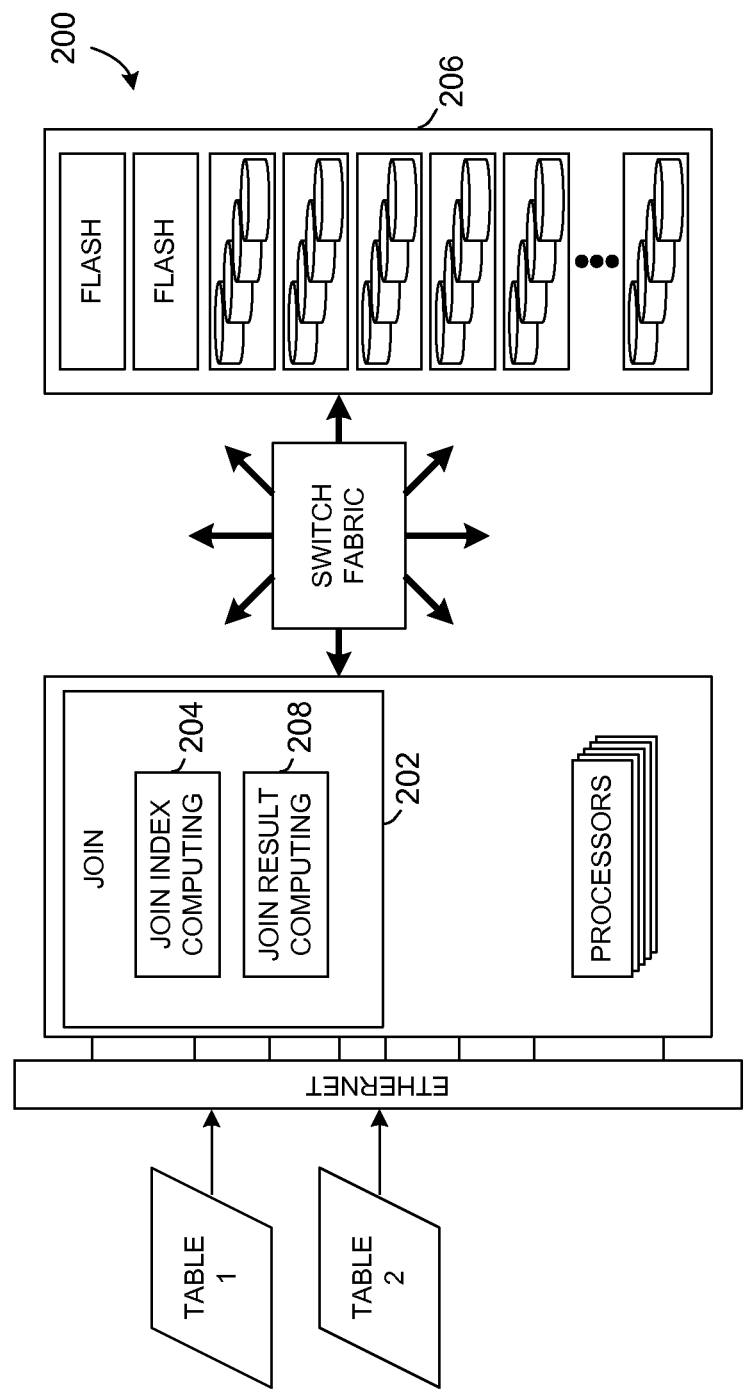
FIG. 2 is a schematic block diagram illustrating an embodiment of a computer-implemented database system that implements a fast join for databases which is adapted for usage with flash storage.

Referring to FIG. 2, a schematic block diagram illustrates an embodiment of a computer-implemented database system 200 that implements a fast join for databases which is adapted for usage with flash storage. The system 200 comprises means 202 for performing a join of two tables stored in a storage 206 in pages processed in a column orientation wherein column values for all rows on a page are co-located in mini-pages within the page. The join performing means 202 can comprise means 204 for computing a join index by accessing only the join columns of input tables and means 208 for computing a join result using the join index in a single read pass through the input tables.

Figure 3:
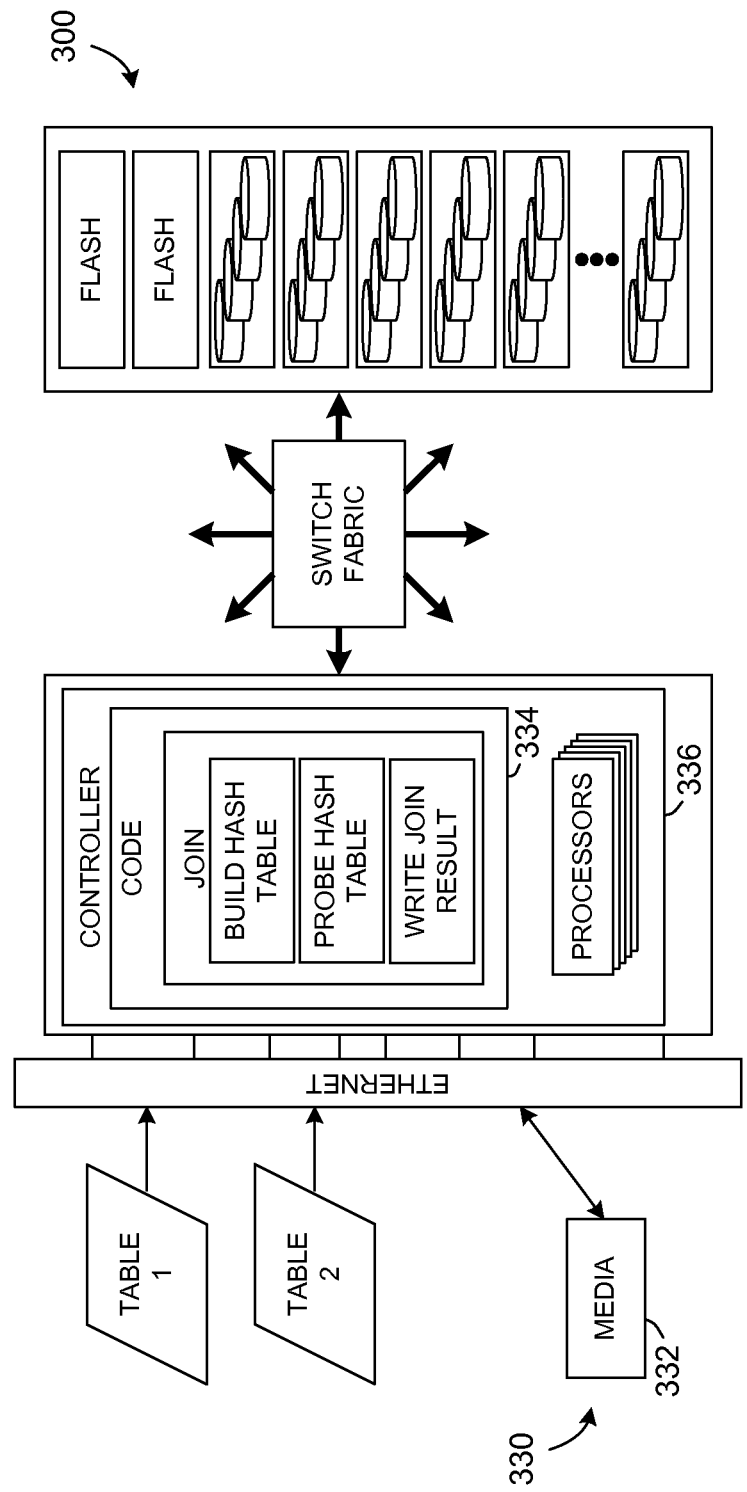
FIG. 3 is a schematic block diagram showing an embodiment of a computer-implemented system in the form of an article of manufacture that implements a fast join for databases which is adapted for usage with flash storage.

Referring to FIG. 3, a schematic block diagram illustrates an embodiment of a computer-implemented system 300 in the form of an article of manufacture 330 that implements a fast join for databases which is adapted for usage with flash storage. The article of manufacture 330 comprises a controller-usable medium 332 having a computer readable program code 334 embodied in a controller 336 for performing a join of a first table and a second table. The computer readable program code 334 comprises code causing the controller 336 to build a hash table comprising reading a single join column of the second table, and code causing the controller 336 to probe the hash table comprising reading a single join column of the first table and probing the hash table for matching join columns from the second table. The computer readable program code 334 further comprises code causing the controller 336 to retrieve projected columns of both the first and second tables for each matching pair of join columns and code causing the controller 336 to write projected columns of both the first and second tables to a join result.

Figure 4C:
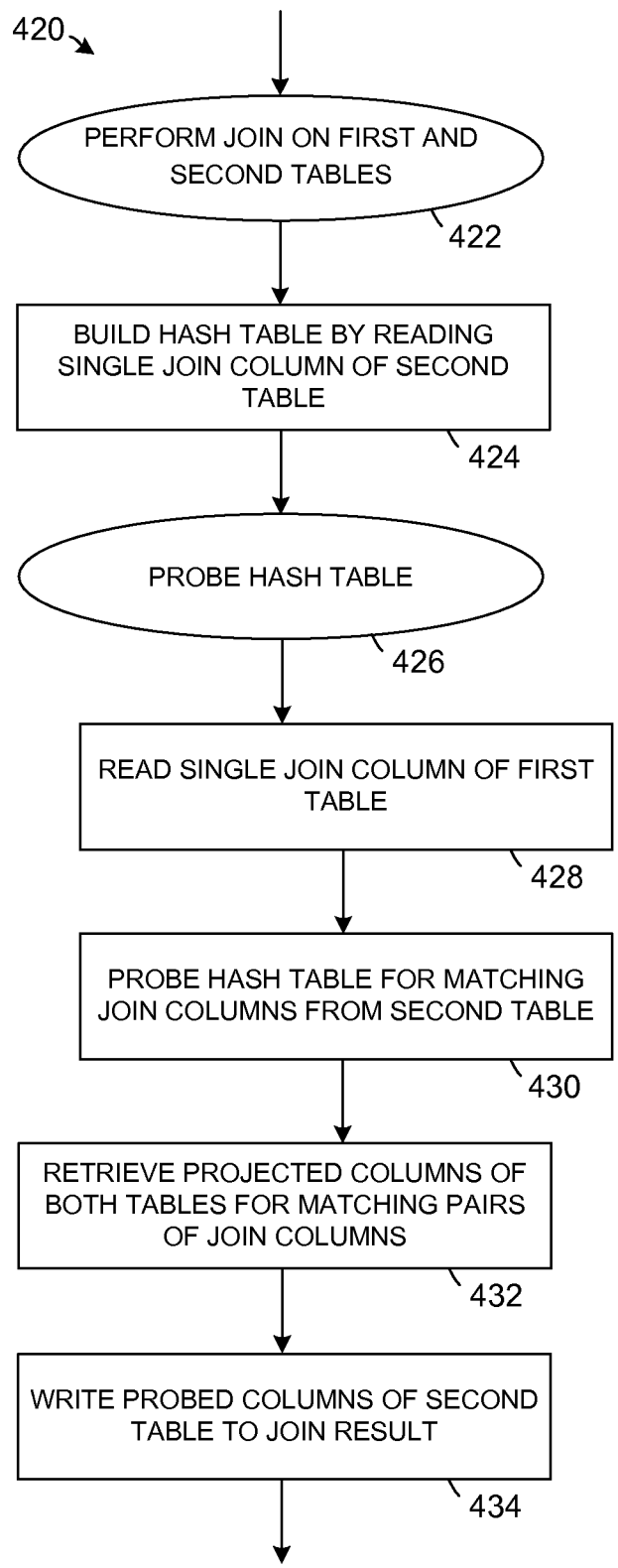

Referring to FIGS. 4A through 4C, flow charts illustrate one or more embodiments or aspects of a computer-executed method for performing a data join. The join method exploits fast random read page accesses and optimizes for reading each page only once, but in a non-sequential order. The disclosed join technique optimizes for writing pages in sequential order. The join algorithm further leverages a column-oriented layout for the rows within a page. With the column-oriented layout, mini-pages containing columns needed for the query can be read without reading any extra columns.

FIG. 4A depicts a computer-executed method 400 for processing data including performing fast join for databases which is adapted for usage with flash storage. A join of two tables stored in storage in pages processed in a column orientation is performed 402 wherein column values for all rows on a page are co-located in mini-pages within the page. Input/output (I/O) operations of the join are reduced by accessing 404 only join columns and mini-pages containing join results. A join index can be computed 406 by accessing only the join columns of input tables, and a join result can be computed 408 using the join index in a single read pass through the input tables.

Referring to FIG. 4B, a join method 410 can further comprise accessing 412 only join columns of input tables, and computing 414 a join index as a list of row identifier pairs wherein rows in a join result are represented by one pair of row identifiers. The pair of row identifiers includes one row identifier from each table for which row join columns are equal. Pages and columns from the fetched pages for can be fetched 416 for usage in computing the join result with the fetches being made only once.

Referring to FIG. 4C, in an example embodiment 420 a join of a first table and a second table can be performed 422 by building 424 a hash table by reading a single join column of the second table, probing 426 the hash table, and writing 434 probed columns of the second table to a join result. Probing 426 the hash table can comprise reading 428 a single join column of the first table, and probing 430 the hash table for matching join columns from the second table. The join embodiment 420 can further comprise retrieving 432 projected columns of both the first and second tables for each matching pair of join columns, and writing 434 projected columns of both the first table and the second table to a join result.

As access times to main memory and disks continue to diverge, faster non-volatile storage technologies become more attractive for speeding up data analysis applications. NAND flash is one such promising substitute for disks. Flash offers faster random reads than disk, consumes less power than disk, and is cheaper than DRAM. Data layouts and join algorithms can be optimized for systems that use flash drives as the non-volatile store.

The disclosed systems and techniques can exploit the fast random reads of flash. A mixture of sequential and random I/O is used in lieu of traditional sequential I/O algorithms to process less data in less time. Measurements on commodity flash drives show that a column-major layout of data pages is faster than a traditional row-based layout for simple scans. Scans are faster when up to 80% of the columns are projected. A novel join algorithm, RARE-join, is designed for a column-based page layout on flash and improves performance over traditional hash join algorithms. RARE-join is superior in many practical cases including when join selectivities are small and only a few columns are projected in the join result. Using flash for storage also improves system energy-efficiency.

Driven by the consumer electronics industry, flash memory is becoming a practical non-volatile storage technology. Flash drives are ubiquitous in cameras, cell-phones, and PDAs. Personal computer vendors ship laptops with flash drives and flash is used in some amount in the enterprise market. For example, vendors such as SimpleTech, Mtron, and FusionIO sell flash-based solid-state drives as replacement for SCSI drives and entire disk arrays. With the ever increasing disparity between main memory and disk access times, enterprise applications strive for a faster non-volatile store. Various applications are investigated to determine whether flash is a suitable replacement for disk.

Several characteristics make flash drives suitable for a variety of read-mostly enterprise applications such as web-page serving and search. Flash drives offer more random read I/Os per second (1500 to 100,000 IO/s), offer sequential bandwidth comparable to traditional drives (20-80 MB/s), and use about ten times less power than disks (0.5 W). Flash is denser and less expensive than DRAM ($18/GB) and is non-volatile. Moreover, flash continues to increase in speed and density, and decrease in cost at a rapid pace. For example, NAND flash density has doubled every year since 1999.

Unfortunately, flash drives cannot simply be used as a drop-in replacement for disk for many database workloads that are at the core of enterprise applications. The random write performance of most consumer flash drives is worse than a typical SATA drive (40 IO/s vs 120 IO/s). Enterprise class flash drives (e.g. Zeus-IOps) alleviate the random write problem, but are much more expensive ($100/GB). Most importantly, although flash drives can give better random I/O performance, traditional query processing algorithms for data analysis stress sequential I/O. For these algorithms, flash drives offer little or no benefit over disk drives.

Query processing methods are sought that are better suited to the characteristics of flash drives. In particular, scan (projection) and join operations over tables stored on flash can be accelerated. The improvements depicted herein use a mixture of random reads and sequential I/O. By leveraging fast random reads of flash, algorithms process less data and thereby offer improved performance. Improvements rely on the practical assumption that most operations only access and retrieve a fraction of all table columns.

To speed up scans and projections, a PAX-based page layout can be used which arranges rows within a page in column-major order. When only a few columns are projected, the layout avoids transferring most of the data while incurring the cost of "random" I/Os to seek between different columns. A comparison of tradeoffs between row-based and PAX-based layouts on flash show that PAX-based layout is as good or better even at a relatively small page size of 64 KB, a size that works well with traditional buffer management.

The novel RARE-join algorithm (RAndom Read Efficient Join) leverages the PAX-based layout by first constructing a join-index and then retrieving the columns for the join results. Both analytically and using times from scan experiments, the RARE-join outperforms traditional hash-based joins in many practical cases. Since the same transfer bandwidth can be attained from flash as disks by striping across multiple drives, better pure performance can be achieved with flash than with disks for data analysis workloads. As a side-effect, the join algorithms on flash improve the energy-efficiency of database systems. Given the rate of technology and cost improvements for flash, flash may have the potential to replace disk eventually.

Two types of flash available including NAND and NOR flash. NAND flash is typically used for data storage, and NOR is typically used in embedded devices as a substitute for programmable ROM. Since current solid state drives are typically composed of NAND flash, NAND flash is generally more pertinent to operations in relational algebra.

The illustrative systems and techniques disclosed herein, exploit architectures that store entire rows inside a page. Moving to a flash storage and using the PAX page layout blurs the line between column-stores and row-stores. A scheme similar to PAX, called MBSM (J. Zhou and K. A. Ross, A multi-resolution block storage model for database design, *IDEAS*, July 2003), co-locates column values in blocks within larger "superblocks" to reduce I/O for traditional disks, and can be exploited for join methods in flash memory.

Referring to FIG. 5, Table I shows disk and flash characteristics from manufacturer specifications including SATA disk (Seagate Barracuda), USB flash (Buffalo), and Zeus flash (STech's ZeusIOps). Table I summarizes the characteristics of current flash drives compared to disks. Along with the conventional metrics, the table also lists the random I/O rate per dollar (IO/s/$), which measures the drive's performance/price, and the random I/O rate per Watt consumed (IO/s/W), which measures the drive's energy-efficiency. Flash drives, although more costly per gigabyte, substantially outperform disk drives on metrics such as IO/s, IO/s/$ and IO/s/Watt.

NAND flash is typically organized into blocks of 128 KB, which are the minimum erase units, and the blocks are subdivided into pages of 2 KB. Once erased, all bits in the block are set to "1". Subsequently, selected bits can be programmed or set to "0" at a finer granularity. No generic rewrite option is available. Unoptimized random writes typically involve a read, erase (which is slow), and program, and thus are slow.

Currently, most NAND flash is limited to approximately 100,000 erase-write cycles per block. To avoid premature failure, most flash drives include wear leveling logic that remaps writes to evenly update all blocks. With wear leveling, writing continuously to a 32 GB drive at 40 MB/s would cause the drive to wear-out after 2.5 years. Since most drives are not fully utilized, the implied typical lifespan is 5-10 years, which is acceptable.

To speed up relational scans and projections on flash, the fact that seek operations are relatively inexpensive can be exploited by introducing additional seeks in lieu of reading data that is not needed in a query. A PAX page layout can be used to enable the trade-off of seeks for reads for tables on flash.

Figure 6A:
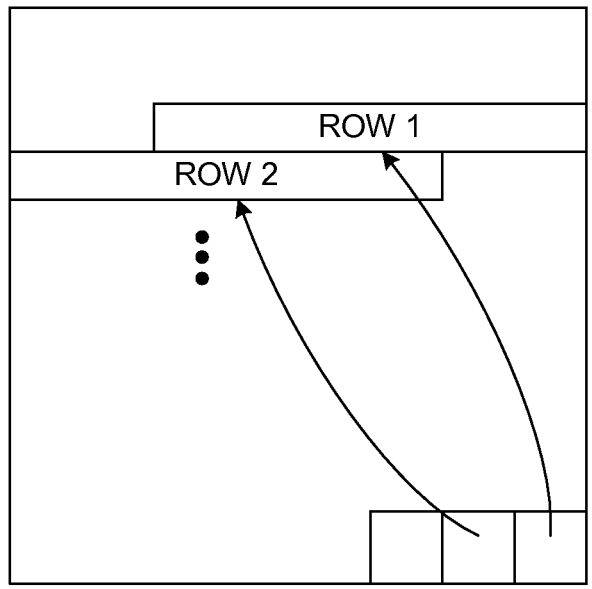
FIGS. 6A and 6B are schematic data structure diagrams respectively showing a conventional data format and a PAX-based layout.
Figure 6B:
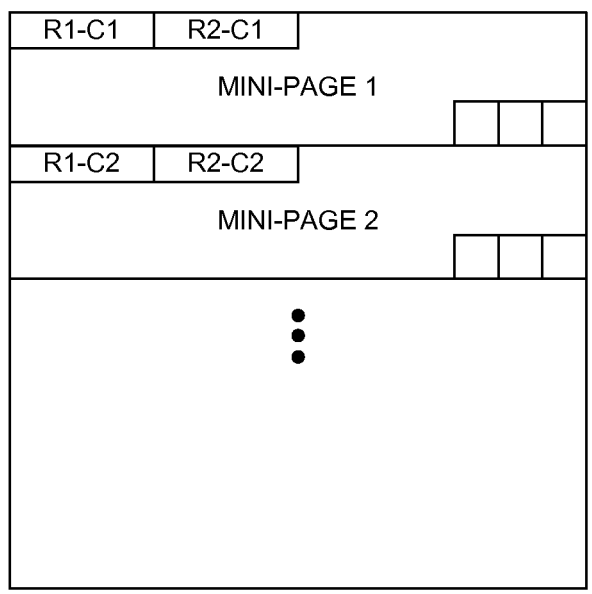

Referring to FIGS. 6A and 6B, schematic data structure diagrams respectively show a conventional data format and a PAX-based layout. Many commercial relational DBMS use a row-based, slotted page format as depicted in FIG. 6A, wherein entire rows are stored contiguously. A PAX-based layout (partition attributes across), shown in FIG. 6B creates mini-pages within each page. Within each mini-page, all of the values for a single column are stored contiguously within a slot array allocated to the mini-page. To reconstruct a single row, the column values are concatenated at the same slot "offset" in each mini-page. The original PAX proposal, targeted only at improving CPU-cache utilization, did not call for a change in disk access patterns. However, a PAX layout can be used to reduce total data transferred and thereby reduce total time for scans.

With the row-based layout, a scan query that needs only a subset of the table columns must retrieve all columns of the table. With PAX-layout, however, a scan query can avoid reading the unneeded columns by "seeking" only and retrieving the needed mini-pages alone. The trade-off of avoiding data transfer at the cost of a seek is advantageous when the time spent seeking from one mini-page to the next is less than the time to read all unneeded mini-pages in-between.

To make skipping a single mini-page on disk worthwhile, mini-pages would need to be 300-400 KB (100 MB/s×3-4 ms per mini-seek), which typically implies database pages on the order of 10 s of megabytes. The "right" page size in a RDBMS also reflects many other factors, such as buffer pool size, buffer-cache hit ratios, update frequency, and per-page algorithmic overheads. Unfortunately, these and other economic considerations lead most commercial RDBMSs to support much smaller page sizes, which typically range from 8 KB to 64 KB.

Although a PAX-based layout is ill-suited for disks, it is more appropriate for flash drives where the overhead for seeks is relatively small. Using the same logic as above, with a flash drive offering 0.1 ms seeks and 40 MB/s transfers, a balanced mini-page size is 4 KB (0.1×40 MB/s). A PAX-based layout then implies database pages of 32 KB-128 KB. With a 32 KB page, a query that projects less than two-thirds of a table will complete faster using a PAX-based layout.

The PAX layout and additional seeks can be leveraged to outperform a traditional Grace-hash join. The RARE-join (RAndom Read Efficient join) is a novel join algorithm that has two main conceptual steps including (1) computing a join index by accessing only the join columns of the input tables, and (2) adapting a join algorithm for PAX layouts on flash. The adapted join uses a join index to compute the join result in a single read pass through the input, thereby reducing input/output (I/O) operations by accessing only the join columns and mini-pages containing the join results rather than the entire input. The savings is attained at the cost of increased "seeks" and computing the join index, which is worthwhile when using flash storage.

Two primary modes exist for both Grace hash join and RARE join including (1) a mode operative when sufficient memory is available to compute the join in one pass through the input, and (2) a mode operative when two passes are required.

Extending RARE join for more passes is completely analogous to extending the Grace join.

For each algorithm, costs can be presented in terms of the number of I/Os required. The cost of a sequential read, a sequential write, and a random read can be assumed to be the same.

For one-pass joins, the simplest case for Grace hash join is when the smaller table $T_2$ fits in memory. The Grace hash reads table $T_2$ and builds a hash table, then reads table $T_1$, probes the hash table, and spools the results to join result R. All accesses are sequential and the total I/O cost is simply $|T_1|+|T_2|+|R|$.

The analogous case for RARE-join is shown in the pseudocode in FIG. 8. Also illustrated is an algorithm using the Player and Game tables shown in FIGS. 7A and 7B. An example join query is: "select name, team, time from player, game where player.team=game.team".

Similar to the Grace hash join, RARE-join first builds, then probes, a hash table. However, only the join column $J_2$ of table $T_2$ is read and stored (along with row identifiers $id_2$) in the hash table in step 1. In contrast, the Grace hash join reads and stores all columns of table $T_2$. Similarly, only the join column $J_1$ of table $T_1$ is read when probing the table in step 2. FIG. 9A shows the hash table for the illustrative example.

The result of probing the table is the join index, which has one entry for each row in the join result R. However, RARE-join materializes only temporary file $I_2$ (which is filled with row-identifiers $id_2$) in the join index. Since the probes occur in $T_1$ order, the necessary $V_1$ columns (all projected columns of table $T_1$) can be read sequentially and written directly to the result R. Since the PAX layout is used, only the V1 columns are written to result R and leave the portion of each page for $V_2$ columns "blank" until step 3. Note that the write pattern for result R is efficient on flash since the cost of the erase is paid in step 2, and the $V_2$ values are programmed in step 3.

Jive join (Z. Li and K. A. Ross, Fast joins using join indices, VLDB J., pp. 1-24, 1999) creates sorted runs of the join index, and then merges the runs to enable fetching of the rows of table $T_2$ sequentially. RARE-join similarly sorts and merges the runs, but exploits the fact that, with flash, the pages of table $T_2$ do not have to be fetched in sequential order and only ensures that all values needed from a single page are obtained with one page read. Therefore, in step 2, RARE-join partitions the ids in temporary file $I_2$ by page number wherein all ids for the same page are placed in the same partition. In step 3, the entire set of $V_2$ pages in a partition are fit in memory at once. The number of partitions needed is therefore $V_2/M$ and the partitioning function can be either a hash or range partitioning scheme. The result rows are partitioned in the same way so that in step 3, join result R is filled with the values $V_2$ in the order of reading. FIGS. 9B and 9C show the contents of the partitions in the example and FIG. 9D shows the final result table.

Jive-join and slam-join algorithms presented by Li and Ross leverage a join-index and store results in a column-oriented format. RARE-join modifies the jive-join algorithm by streamlining with join-index creation and avoiding the unnecessary steps used to make accesses sequential for disk.

After step 3, the pages from all partitions of result R are combined into a single file simply by linking the pages together. The total I/O cost of all three steps is: $|J_1|+|V_1|+|J_2|+|V_2|+|R|+2|I_2|$. Combining the previous two equations, RARE-join outperforms Grace join when: $(|T_1|-(|J_1|+|V_1|))+(|T_2|-(|J_2|+|V_2|))>2|I_2|$. The left-hand side of the inequality reflects savings from reading only the join and projected columns. The savings must outweigh the additional cost of materializing and reading the row-ids $id_2$ from the join-index.

Note that if $J_2$ and $V_2$ fit in memory (which is always the case when table $T_2$ does), then the join index $I_2$ does not have to be written at all. Instead, the columns of $V_2$ can be read in step 2 and RARE-join behaves just like Grace join, except that RARE-join saves I/O by reading only the join and projected columns, and the mini-pages of projected columns are read only for rows in the join result R, not for all rows. When selectivity is low, omitting reading of all rows can be faster.

Conversely, the one-pass RARE-join algorithm does not require all of table $T_2$ to fit in memory, and thus can be used with tables that would require a two-pass Grace hash join.

The potential gain from RARE-join can be illustrated with an example. Given tables $T_1$ and $T_2$ each have 8 columns of 4 bytes and the join result projects only 3 columns from each. Further given that half the rows in table $T_1$ each match one row in table $T_2$. Savings can be estimated using performance numbers based on memory layout.

Assuming tables $T_1$ and $T_2$ each contain 64 million rows (32 GB), then result R and temporary file $I_2$ will have 32 M rows and be sizes 768 MB and 128 MB, respectively. Assuming 64 KB pages are used, scanning table $T_1$ takes 74 s, reading join column $J_1$ (one column) takes 25.8 s, and reading projected columns $V_1$ (two columns) takes 33.48 s. The same numbers apply to table $T_2$, join column $J_2$, and projected columns $V_2$. Writing result R is estimated to take 30 s and a pass through temporary file $I_2$ takes 5 s. Therefore, Grace join will take 178 s while RARE join will take only 158 s, a savings of 20 s or 12%. The savings from reading only the projected columns is 30 s and the penalty for reading and writing the join-index is 10 s.

The RARE-join can also be implemented for a two-pass joins. A two-pass Grace hash join is straightforward and in a first pass partitions both tables on the join columns, reading and writing tables $T_1$ and $T_2$. The second pass reads each partition and computes and writes the join result, with a total cost of $3(|T_1|+|T_2|)+|R|$.

Most joins use at most two passes with flash, since the outgoing buffer size can be small, for example 64 KB. With 2 GB of main memory, room is available to create 32,000 partitions. Therefore, a two-pass Grace join is sufficient for size of table $T_2$ up to 65 TB, which is much larger than the size of current flash drives.

FIG. 10 shows pseudocode for the RARE-join when join column $J_2$ and the outgoing buffers do not fit in memory. For the RARE-join, steps 1 and 2 are similar to steps in Grace-hash join. RARE-join hash partitions the join column of both tables so that each $J_2$ partition can fit in memory. In step 3, the RARE-join computes and materializes the join-index <$id_1$, $id_2$> for each partition. Note that within each partition, the join index is ordered by $id_1$.

Step 4 of RARE-join merges the partitions of a temporary file holding the join index JI into table $T_1$ order and fetches the needed projection columns $V_1$. RARE-join spools the result and $id_2$ values to partitions of R and $I_2$, as in the one-pass algorithm. Then, step 5 is the same as step 3 of the one-pass RARE algorithm. The join index is exactly twice the size of $I_2$, since the index contains both $id_1$ and $id_2$. The total cost is therefore $3|J_1|+|V_1|+3|J_2|+|V_2|+|R|+6|I_2|$.

Two-pass RARE-join therefore beats two-pass Grace hash join when $3(|T_1|-|J_1|)-|V_1|+3(|T_2|-|J_2|)-|V_2|>6|I_2|$. Again, the left-hand side of the inequality reflects the savings from only accessing the join and projection columns. The right-hand side is the penalty for materializing the join index.

Savings from RARE-join can be illustrated with an example. Given tables $T_1$ and $T_2$ have the same schema as in the previous example but are ten times larger (20 GB each), the same join query is evaluated, resulting in 320 M rows, with 6 attributes of 4 bytes each. Thus, join result R has size 7.5 GB and $I_2$ has size 1.2 GB. Using the performance numbers, reading table $T_1$ takes 740 s and writing result R takes 295 s. Grace hash thus takes a total of 4735 s. The first read of $J_1$ will take 258 s, and estimated subsequent passes take 98 s (as contiguous data). Reading columns $V_1$ takes 334 s, and writing $I_2$ is estimated to take 50 s. RARE-join, in the example, will take 1503 s, a savings of 70%, a saving mainly resulting from making multiple passes over columns $J_1$ and $J_2$ rather than over tables $T_1$ and $T_2$.

RARE-join has advantages that extend beyond analysis of cost equations. First, RARE-join has much smaller memory requirements than Grace-join for the same inputs and thus remains in the one-pass mode for much larger input sizes. RARE-join similarly has much smaller memory requirements for two-pass mode. Second, the illustrative equations actually overestimate the cost for reading $V_1$ and $V_2$. Since the rows which participate in the join are known from the join index, only those rows are fetched, rather than the entire table. When the join selectivity is sufficiently low, whole pages may be skipped to save I/Os.

A disadvantage of RARE-join, similar to jive-join, is that the join results must be materialized which, for some data analysis functions such as computing materialized views, is not an issue. However, when used in a pipelined query plan, the above comparison is unfair and a better consideration may be to use a Grace-join that simply scans only the needed projection columns (for example $V_1$ and $V_2$). Even so, RARE-join can be more efficient if the join result size or selectivity is sufficiently small. For example, in two-pass mode, the savings from processing a single join column instead of the entire table or projection columns (with multiplier 3) can outweigh the cost of writing the result in many practical cases.

In various applications and implementations, several techniques can be used to improve RARE-join. For example, the hash table on join column $J_2$ can use compression for duplicate values. The results of the one-pass algorithm when ($J_2$+$V_2$) fit in memory can easily be pipelined, and the algorithm can be modified to pipeline the result rows for the other cases. As Hybrid hash join does, RARE-join can potentially use available memory more effectively on the first pass through the data. Aspects of other join algorithms, such as index-nested loops join and sort-merge join, can be adapted for PAX layouts on flash.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A computer-implemented system comprising:
   a processor that performs a join of two tables stored in a storage in pages processed in a column orientation wherein column values for all rows on a page are co-located in mini-pages within the page, the processor reducing input/output operations of the join by accessing only join columns and mini-pages containing join results; and
   the processor that computes a join index by accessing only the join columns of input tables and uses the join index to compute a join result in a single read pass through the input tables.

2. The system according to claim 1 further comprising:
   the processor that accesses only the join columns of the input tables, and computes a join index as a list of row identifier pairs wherein rows in a join result are represented by one pair of row identifiers, one row identifier from each table for which row join columns are equal; and
   the processor that fetches pages and columns from the fetched pages for usage in computing the join result wherein rows are represented by one pair of row identifiers, the fetches being made only once.

3. The system according to claim 1 further comprising:
   the processor that optimizes for fast random read page accesses wherein pages are read only once in non-sequential order and pages are written in sequential order.

4. The system according to claim 1 further comprising:
the processor that performs a one-pass join of a first table and a second table wherein both the first table and the second table fit in memory comprising:
  building a hash table comprising reading a single join column of the second table;
  probing the hash table comprising reading a single join column of the first table and probing the hash table for matching join columns from the second table;
  retrieving projected columns of both the first and second tables for each matching pair of join columns; and
  writing retrieved columns of both the first and second tables to a join result.

5. The system according to claim 1 further comprising:
the processor that performs a one-pass join over a second table and a separate pass over a first table wherein the first table does not fit in memory in combination with the second table comprising:
  probing the hash table for each join result of a first table row identifier and a second table row identifier comprising:
    reading values of projected columns of the first table indexed by the first table row identifier;
    writing the projected values into a partition of the join result partitioned by the page identifiers of the second table; and
    writing the second table row identifier into a partition of a temporary file of second table row identifiers; and
the processor that writes projected columns of the second table to a join result comprising:
  reading values of projected columns of the second table indexed by the second table row identifier; and
  writing the projected values into the partition of the join result.

6. The system according to claim 1 further comprising:
the processor that performs a two-pass join of a first table and a second table comprising:
  partitioning the first and second tables on join columns wherein the first table and the second table are both read and written; and
  computing a join result comprising reading each partition, computing, and writing the join result.

7. The system according to claim 1 further comprising:
the processor that performs a two-pass join of a first table and a second table comprising:
  reading and partitioning a column of the second table using a hash function on join value;
  reading and partitioning a column of the first table using the hash function;
  computing a join index containing a first table row identifier and a second table row identifier for each partition;
  merging partitions of the join index containing the first table row identifier and the second table row identifier for each partition into first table order, fetching projected columns of the first table, and writing projected values into a partition of a join result and second table row identifiers into a partition of a temporary file of second table row identifiers; and
  writing probed columns of the second table to a join result.

8. The system according to claim 1 further comprising:
the processor that performs a two-pass join of a first table and a second table comprising:
  reading and partitioning a join column of the second table using a hash function n join value;
  reading and partitioning a join column of the first table using the hash function;
  computing a join index containing a first table row identifier and a second table row identifier for each partition comprising:
    reading the column of the second table and building a hash function;
    reading a partition of the first table and probing the hash table; and
    for each row in a join result, retrieving the projected columns from the first table and writing the projected values into a partition of the join result;
  writing the second table row identifier into a partition of a temporary file of second table row identifiers; and
  computing a final result comprising:
    reading values of projected columns of the second table indexed by the second table row identifier; and
    writing the projected values into the partition of the join result.

9. The system according to claim 1 further comprising:
the storage comprising a non-volatile store that supports fast page-based random accesses, the storage selected from a group consisting of a flash-based solid state drive, phase-change random access memory (PCRAM), ferroelectric random access memory (FeRAM), magneto-resistive random access memory (MRAM), and nano-random access memory (NRAM).

10. A non-transitory computer readable medium having stored thereon a computer executable program for processing data, the computer executable program when executed causes a computer system to:
  perform a join of two tables stored in a storage in pages processed in a column orientation wherein column values for all rows on a page are co-located in mini-pages within the page;
  reduce input/output operations of the join by accessing only join columns and mini-pages containing join results;
  compute a join index by accessing only the join columns of input tables; and
  use the join index to compute a join result in a single read pass through the input tables.

11. The non-transitory computer readable medium according to claim 10 further comprising the computer executable program for:
  performing a join of a first table and a second table comprising;
    building a hash table comprising reading a single join column of the second table;
    probing the hash table comprising reading a single join column of the first table and probing the hash table for matching join columns from the second table;
    retrieving projected columns of both the first and second tables for each matching pair of join columns; and
    writing projected columns of both the first and second tables to a join result.

12. A computer-executed method of processing data comprising:
  performing a join of two tables stored in a storage in pages processed in a column orientation wherein column values for all rows on a page are co-located in mini-pages within the page;
  reducing input/output operations of the join by accessing only join columns and mini-pages containing join results;

computing a join index by accessing only the join columns of input tables; and using the join index to compute a join result in a single read pass through the input tables.

13. The method according to claim 12 further comprising:

accessing only the join columns of the input tables;

computing a join index as a list of row identifier pairs wherein rows in a join result are represented by one pair of row identifiers, one row identifier from each table for which row join columns are equal; and fetching pages and columns from the fetched pages for usage in computing the join result wherein rows are represented by one pair of row identifiers, the fetches being made only once.

14. The method according to claim 12 further comprising:

performing a join of a first table and a second table comprising:
- building a hash table comprising reading a single join column of the second table;
- probing the hash table comprising reading a single join column of the first table and probing the hash table for matching join columns from the second table;
- retrieving projected columns of both the first and second tables for each matching pair of join columns; and writing projected columns of both the first table and the second table to a join result.

* * * * *